US008805751B2

(12) United States Patent
Ortiz (10) Patent No.: US 8,805,751 B2
(45) Date of Patent: Aug. 12, 2014

(54) USER CLASS BASED MEDIA CONTENT RECOMMENDATION METHODS AND SYSTEMS

(75) Inventor: Guillermo Ortiz, Woburn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 347 days.

(21) Appl. No.: 13/273,018

(22) Filed: Oct. 13, 2011

(65) Prior Publication Data

US 2013/0097101 A1 Apr. 18, 2013

(51) Int. Cl.
*G06F 15/18* (2006.01)

(52) U.S. Cl.
USPC .......................................................... 706/12

(58) Field of Classification Search
CPC ........................................................ G06N 3/08
USPC .......................................................... 706/12
See application file for complete search history.

(56) References Cited

U.S. PATENT DOCUMENTS

2011/0055871 A1* 3/2011 Bi et al. ........................ 725/43

OTHER PUBLICATIONS

Burke, R., "Hybrid Web Recommender System", Brusilvosky, P. et al. (Eds.), The Adaptive Web, pp. 377-408, 2007.*
Su, X and Khoshgoftaar, T. M., "A Survey of Collaborative Filtering Techniques", Advances in Artificial Intelligence, vol. 2009, article ID 421425, 19 pages.*
Ben-Shimon, D. et al., "Recommender System from Personal Socal Networks", Wegrzyn-Wolska, KM et al. (Eds.), Adv. in Intel. Web, pp. 47-55, 2007.*

* cited by examiner

*Primary Examiner* — Kakali Chaki
*Assistant Examiner* — Vincent Gonzales (57) ABSTRACT

An exemplary method includes a media content recommendation system assigning a user of a media content service to a user class included in a plurality of predefined user classes each associated with the media content service, selecting a weight-based recommendation heuristic that is associated with the user class from a plurality of available weight-based recommendation heuristics each associated with a distinct user class included in the plurality of predefined user classes, and generating, in accordance with the selected weight-based recommendation heuristic, a recommendation score associated with a media content instance available for access by the user by way of a media content access device associated with the media content service. Corresponding methods and systems are also disclosed.

20 Claims, 8 Drawing Sheets

USER CLASS BASED MEDIA CONTENT RECOMMENDATION METHODS AND SYSTEMS

BACKGROUND INFORMATION

As media content providers have expanded and continue to expand the media content choices available to users by way of set-top box devices and other types of media content access devices, it has become more difficult for users of such devices to locate media content that actually interests the user. For example, a user may have access to hundreds or even thousands of channels by way of a set-top box device, but be interested in only a small fraction of the media content programs offered by way of these channels. Hence, the user may have to either channel surf through a relatively large number of channels or scroll through many pages of an on-screen program guide before finding a media content program in which he or she is interested. Not only is this cumbersome and time-consuming for the user, but it may result in missed viewing opportunities, which, in turn, may lead to reduced revenue for the television network service provider.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

User class based media content recommendation methods and systems are described herein. As will be described below, a media content recommendation system may assign a user of a media content service to a user class included in a plurality of predefined user classes each associated with the media content service, select a weight-based recommendation heuristic that is associated with the user class from a plurality of available weight-based recommendation heuristics each associated with a distinct user class included in the plurality of predefined user classes, and generate, in accordance with the selected weight-based recommendation heuristic, a recommendation score associated with a media content instance available for access by the user by way of a media content access device associated with the media content service. The media content recommendation system may perform one or more actions with respect to the recommendation score in any suitable manner. For example, the media content recommendation system may present one or more access options associated with the media content instance to the user if the recommendation score of the media content instance is above a predetermined threshold.

As used herein, the terms "media content" and "media content instance" may refer to any media content program, television program, on-demand media program, pay-per-view media program, broadcast media program (e.g., broadcast television program), multicast media program (e.g., multicast television program), narrowcast media program (e.g., narrowcast video-on-demand program), IPTV media content, advertisement, video, movie, audio program, radio program, or any segment, component, or combination of these or other forms of media content that a user may access by way of a media content access device.

As used herein, a "media content service" may refer to any service configured to provide a user with access to media content, descriptions of media content, media content recommendations, and/or any other information associated with media content. For example, a media content service may include a subscriber television service (e.g., a cable, fiber optic, and/or satellite television service), an Internet-based media content service (e.g., an Internet-based streaming video service and/or a streaming music service), and/or any other type of service as may serve a particular implementation. A media content service may additionally or alternatively include a companion television application service configured to be provided by way of a companion device (e.g., a mobile phone or a tablet computer) to a media content access device (e.g., a set-top box device). As will be described below, a companion television application service may be configured to provide enhanced content (e.g., recommendations, advertisements, program guide information, etc.) associated with media content available by way of the media content access device.

As used herein, a "weight-based recommendation heuristic" may refer to any suitable heuristic that may be used to generate a recommendation score associated with a media content instance for a particular user. Exemplary weight-based recommendation heuristics will be described below.

By assigning a user to a particular user class associated with a media content service and then selecting a weight-based recommendation heuristic based on the assigned user class, the methods and systems described herein may facilitate generation of effective and personalized media content recommendations for a user of a media content service. For example, if the user has not created an account with the media content service, the user may be assigned to an "anonymous" user class. In this case, a weight-based recommendation heuristic may be selected that is more heavily weighted to rely on user ratings provided by other users of the media content service. However, if the user has created an account and a user profile with the media content service, linked his or her social media network to the media content service, and used the media content service for a relatively long period of time, the user may be assigned to a "fully active" user class. In this case, a weight-based recommendation heuristic may be selected that is more heavily weighted to rely on preferences of the user, user ratings provided by one or more social media contacts of the user, and a media content access history (e.g., a viewing history) of the user. These and other examples will be described in more detail below.

Figure 1:
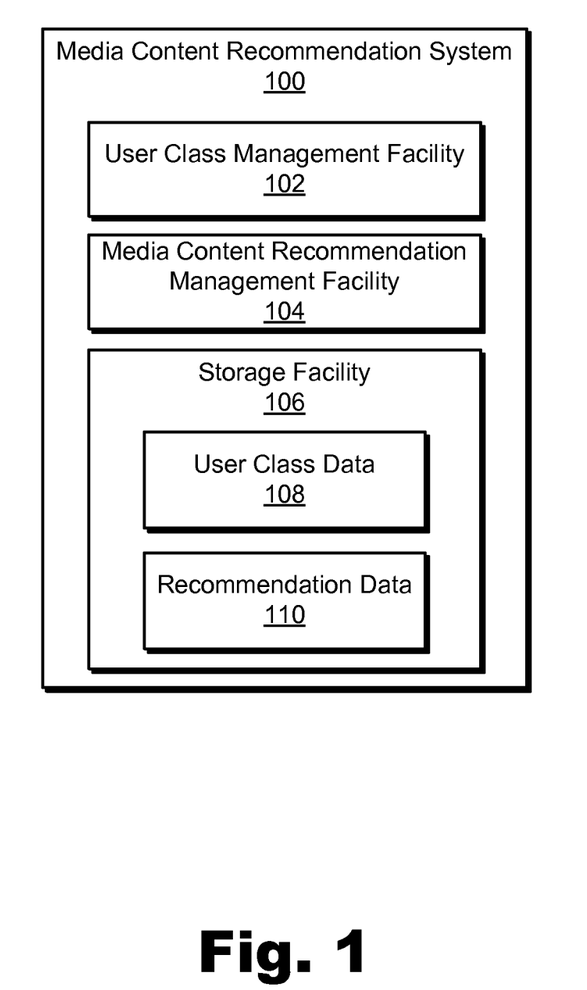
FIG. 1 illustrates an exemplary media content recommendation system according to principles described herein.

FIG. 1 illustrates an exemplary media content recommendation system 100 ("system 100"). As shown, system 100 may include, without limitation, a user class management facility 102, a media content recommendation management facility 104 ("recommendation management facility 104"), and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation.

User class management facility 102 may be configured to perform one or more user class management operations. For example, user class management facility 102 may be configured to manage (e.g., maintain, update, modify, etc.) data that defines a plurality of different user classes that may be associated with a particular media content service. Any number of user classes may be associated with a media content service as may serve a particular implementation. Each user class describes a particular type of user of the media content service.

For example, a first user class (referred to herein as an "anonymous" user class) may be used to classify or describe users who use the media content service without creating an account with the media content service, without providing information (e.g., user profile information, social media network information, etc.) that can be used to personalize media content recommendations for the user, and/or without logging into the media content service. To illustrate, an "anonymous" user may use a companion television application service provided by way of a companion device while watching television without registering with and/or logging in to the companion television application service.

A second user class (referred to herein as a "social anonymous" user class) may be used to classify or describe users who have linked their social media network to the media content service, but who have not created an account with the media content service. For example, a "social anonymous" user may access the media content service by way of a link provided on a social media networking website (e.g., Facebook). In this manner, the media content service may have access to the social media network of the user (e.g., information identifying one or more social media contacts of the user), even though the user may not have already created an account with the media content service.

A third user class (referred to herein as a "new" user class) may be used to classify or describe users who have created an account with the media content service and who have created (e.g., completed) a user profile within the media content service. For example, a "new" user may have just signed up for the media content service, but may not have linked his or her social media network to the media content service or started building a media content access history (e.g., a viewing history) while using the media content service.

A fourth user class (referred to herein as an "early" user class) may be used to classify or describe users who have created an account with the media content service, created a user profile within the media content service, linked his or her social media network to the media content service, and started building a media content access history (e.g., a viewing history) while using the media content service. For example, an "early" user may have used the media content service for a relatively short period of time (e.g., a few days) after creating an account with the media content service.

A fifth user class (referred to herein as an "fully active" user class) may be used to classify or describe users who, like early users, have created an account with the media content service, created a user profile within the media content service, and linked his or her social media network to the media content service. However, a "fully active" user has also established a relatively extensive media content access history (e.g., a viewing history) while using the media content service. For example, a fully active user may have used the media content service for a relatively long period of time (e.g., months or years) after creating an account with the media content service.

In some examples, user class management facility 102 may be configured to assign a user of a media content service to a particular user class included in a plurality of predefined user classes. For example, user class management facility 102 may be configured to assign a user of a media content service to any of the five user classes described above.

User class management facility 102 may be configured to assign a user of a media content service to a particular user class in any suitable manner. For example, user class management facility 102 may detect one or more operations performed by the user with respect to the media content service and assign the user to a user class based on the one or more performed operations. Exemplary operations performed by a user with respect to a media content service include, but are not limited to, the user using the media content service, creating an account associated with the media content service (e.g., by establishing a user name and/or password for use with the media content service), creating a user profile associated with the media content service (e.g., by providing user profile information such as demographic information associated with the user, genre preferences, etc.), linking a social media network of the user with the media content service (e.g., by authorizing the media content service to access information associated with one or more social media networks and/or social media contacts of the user), and accessing one or more media content instances available by way of the media content service (e.g., by viewing, recording, listening to, and/or otherwise experiencing the one or more media content instances).

To illustrate, user class management facility 102 may detect that a user has created an account and user profile with the media content service, but that the user has not yet linked his or her social media network with the media content service or accessed any media content instances while using the media content service. In response to these detected operations, user class management facility 102 may assign the user to the "new" user class described above.

In some examples, user class management facility 102 may dynamically reassign a user from one user class to another. For example, a user originally assigned to the "new" user class may subsequently link his or her social media network with the media content service and begin building a media content access history. In response, user class management facility 102 may dynamically reassign the user from the "new" user class to the "early" user class.

Recommendation management facility 104 may be configured to perform one or more media content recommendation management operations. For example, recommendation management facility 104 may select a weight-based recommendation heuristic that is associated with a user class to which a user has been assigned and generate, in accordance with the selected weight-based recommendation heuristic, a recommendation score associated with a media content instance available for access by the user by way of a media content access device associated with the media content service.

Recommendation management facility 104 may select a weight-based recommendation heuristic in any suitable manner. For example, recommendation management facility 104 may maintain and/or have access to a plurality of available weight-based recommendation heuristics that are each associated with a distinct user class included in a plurality of predefined user classes and that may each be used to generate a recommendation score for a media content instance. Once user class management facility 102 assigns a user to a particular user class, recommendation management facility 104 may select a weight-based recommendation heuristic from the plurality of available weight-based recommendation heuristics that is associated with the particular user class.

As will be described below, each weight-based recommendation heuristic managed by recommendation management facility 104 may be weighted differently depending on its associated user class. For example, a weight-based recommendation heuristic associated with the "anonymous" user class described above may be more heavily weighted to rely on user ratings provided by users who are not social media contacts of the user (e.g., other users of the media content service). In contrast, a weight-based recommendation heuristic associated with the "fully active" user class described above may be more heavily weighted to rely on preferences of the user, user ratings provided by one or more social media contacts of the user, and a media content access history (e.g., a viewing history) of the user. Specific examples of weight-based recommendation heuristics will be provided below.

Recommendation management facility 104 may generate a recommendation score for a media content instance in accordance with a weight-based recommendation heuristic in any suitable manner. For example, a weight-based recommendation heuristic may specify that the recommendation score for a particular media content instance is to be based on a weighted combination of one or more of the following: 1) an average rating of the media content instance provided by one or more social media contacts of the user, 2) an average rating of the media content instance provided by one or more users who are not social media contacts of the user, 3) an automatically generated rating of the media content instance based on a media content access history of the user, and 4) an automatically generated rating of the media content instance based on one or more preferences of the user as specified within a user profile of the user. Hence, recommendation management facility 104 may determine one or more of these ratings in accordance with the selected weight-based recommendation heuristic and use the one or more determined ratings in combination with a weighted formula specific to the selected weight-based recommendation heuristic to generate the recommendation score for the media content instance. Specific examples of this will be provided in more detail below.

Recommendation management facility 104 may process and/or otherwise use a recommendation score generated for a particular media content instance in any suitable manner. For example, recommendation management facility 104 may determine that the recommendation score is above a predetermined threshold and, in response, present one or more access options associated with the media content instance within a graphical user interface ("GUI"). To illustrate, if a recommendation score for the media content instance is above a predetermined threshold, recommendation management facility 104 may graphically indicate that the media content instance is recommended for the user, allow a user to access (e.g., tune to, play, record, or otherwise access) the media content instance, present program guide information and/or advertisement content associated with the media content instance, and/or otherwise present one or more access options associated with the media content instance within a GUI.

In some examples, recommendation management facility 104 may present the one or more access options within a GUI displayed within a display screen associated with the same media content access device that is used to access the media content instance. For example, the one or more access options may be displayed by a television associated with a set-top box device.

Alternatively, recommendation management facility 104 may present the one or more access options within a GUI displayed within a display screen of a companion device separate from the media content access device used to access the media content instance. For example, the one or more access options may be displayed within a display screen of a mobile device (e.g., a mobile phone or a tablet computer) used by a user while the user accesses (e.g., watches) the media content instance by way of a set-top box device.

In either case, recommendation management facility 104 may detect a selection by the user of one of the presented access options and direct the media content access device to perform the selected access option. For example, an option to tune to a channel carrying a recommended media content instance may be presented within a GUI displayed by a companion device. Recommendation management facility 104 may detect a user selection of the option and direct the media content access device to tune to the channel carrying the recommended media content instance.

In some examples, recommendation management facility 104 may generate recommendation scores for a plurality of media content instances available for access by a user by way of a media content access device. Recommendation management facility 104 may then rank the media content instances based on the recommendation scores and present (e.g., within a GUI) the ranked media content instances within a list of recommended media content instances. The presentation order of the list of recommended media content instances may be based on the recommendation score of each respective media content instance. An example of this will be provided in more detail below.

A recommendation score associated with a media content instance may be dynamically updated in response to one or more factors involved in the generation of the recommendation score. For example, an average rating of the media content instance may change as more social media contacts of the user rate the media content instance over time. Recommendation management facility 104 may dynamically update the recommendation score (e.g., generate a new recommendation score) associated with the media content instance accordingly. Additionally or alternatively, recommendation management facility 104 may generate a new recommendation score for a media content instance in response to a reassignment of the user to a different user class.

Storage facility 106 may be configured to maintain user class data 108 and recommendation data 110. User class data 108 may be representative of one or more predefined user classes and may be used by user class management facility 102. Recommendation data 110 may include any data generated and/or used by recommendation management facility 104. It will be recognized that storage facility 106 may maintain additional or alternative data as may serve a particular implementation.

Figure 2:
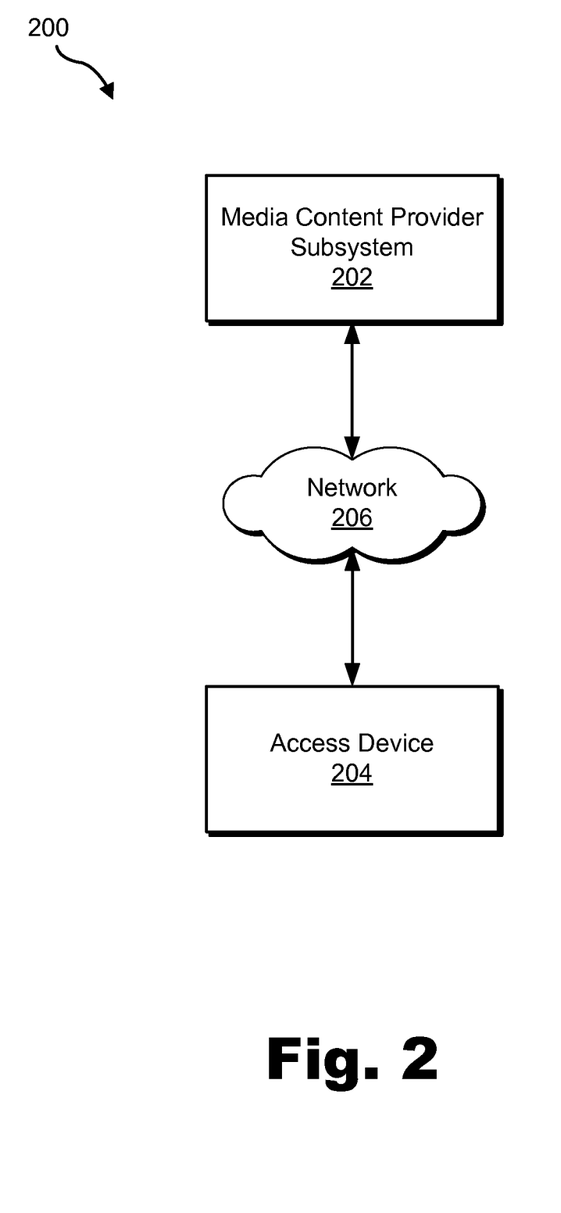
FIG. 2 illustrates an exemplary implementation of the system of FIG. 1 according to principles described herein.

FIG. 2 illustrates an exemplary implementation 200 of system 100 wherein a media content provider subsystem 202 is communicatively coupled to a media content access device 204 ("access device 204") by way of a network 206. As will be described in more detail below, user class management facility 102, recommendation management facility 104, and storage facility 106 may each be implemented by media content provider subsystem 202 and/or access device 204.

Media content provider subsystem 202 may be associated with a service provider (e.g., a subscriber television service provider, an Internet service provider, etc.), a media content program provider (e.g., ESPN, NBC, etc.), and/or any other type of media content provider. Accordingly, media content provider subsystem 202 may be configured to provide one or more media content services (e.g., television services, video-on-demand services, Internet services, companion television application services, etc.) to access device 204. For example, media content provider subsystem 202 may be configured to manage (e.g., maintain, process, distribute, and/or generate) media content (e.g., media content programs, advertisements, etc.) configured to be delivered to access device 204. Media content provider subsystem 202 may be implemented by one or more computing devices as may serve a particular implementation.

Additionally or alternatively, media content provider subsystem 202 may be implemented by one or more third party servers configured to manage recommended media content, interface with one or more social media service provider subsystems, and/or perform any other operation associated with the methods and systems described herein.

Access device 204 may facilitate access by a user to content (e.g., media content programs) provided by media content provider subsystem 202. For example, access device 204 may be configured to perform one or more access events at the direction of a user. To illustrate, access device 204 may present and/or record a media content program at the direction of a user.

Access device 204 may be implemented by any suitable combination of media content processing or computing devices ("processing devices"). For example, access device 204 may be implemented by one or more set-top box devices, DVR devices, personal computers, mobile devices (e.g., mobile phones and/or tablet computers), personal-digital assistant devices, gaming devices, television devices, etc.

Media content provider subsystem 202 and access device 204 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Media content provider subsystem 202 and access device 204 may communicate using any suitable network. For example, as shown in FIG. 2, media content provider subsystem 202 and access device 204 may be configured to communicate with each other by way of network 206. Network 206 may include one or more networks or types of networks capable of carrying communications and/or data signals between media content provider subsystem 202 and access device 204. For example, network 206 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

Figure 3:
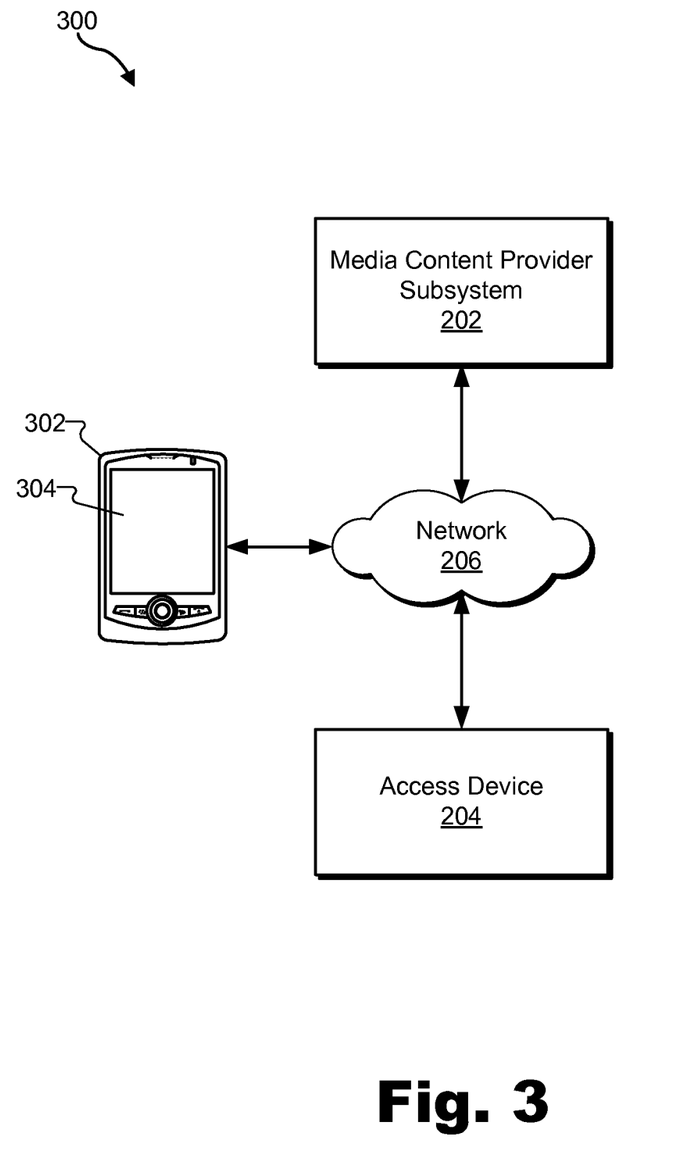
FIG. 3 illustrates another exemplary implementation of the system of FIG. 1 according to principles described herein.

FIG. 3 illustrates another exemplary implementation 300 of system 100. Implementation 300 is similar to implementation 200 in that it includes media content provider subsystem 202 and access device 204 configured to communicate by way of network 206. However, implementation 300 further includes a companion device 302 configured to facilitate user access to a media content service associated with media content available by way of access device 204. For example, companion device 302 may be configured to facilitate access to a companion television application service associated with a television service provided by way of access device 204. As shown, companion device 302 may communicate with access device 204 by way of network 206 (e.g., by way of a home Wi-Fi network or the like), and may utilize any suitable communication technologies, devices, media, and protocols supportive of data communications.

In certain embodiments, system 100 may be implemented entirely by media content provider subsystem 202, by access device 204, or by companion device 302. In other embodiments, components of system 100 may be distributed across any combination of media content provider subsystem 202, access device 204, and companion device 302.

Figure 4:
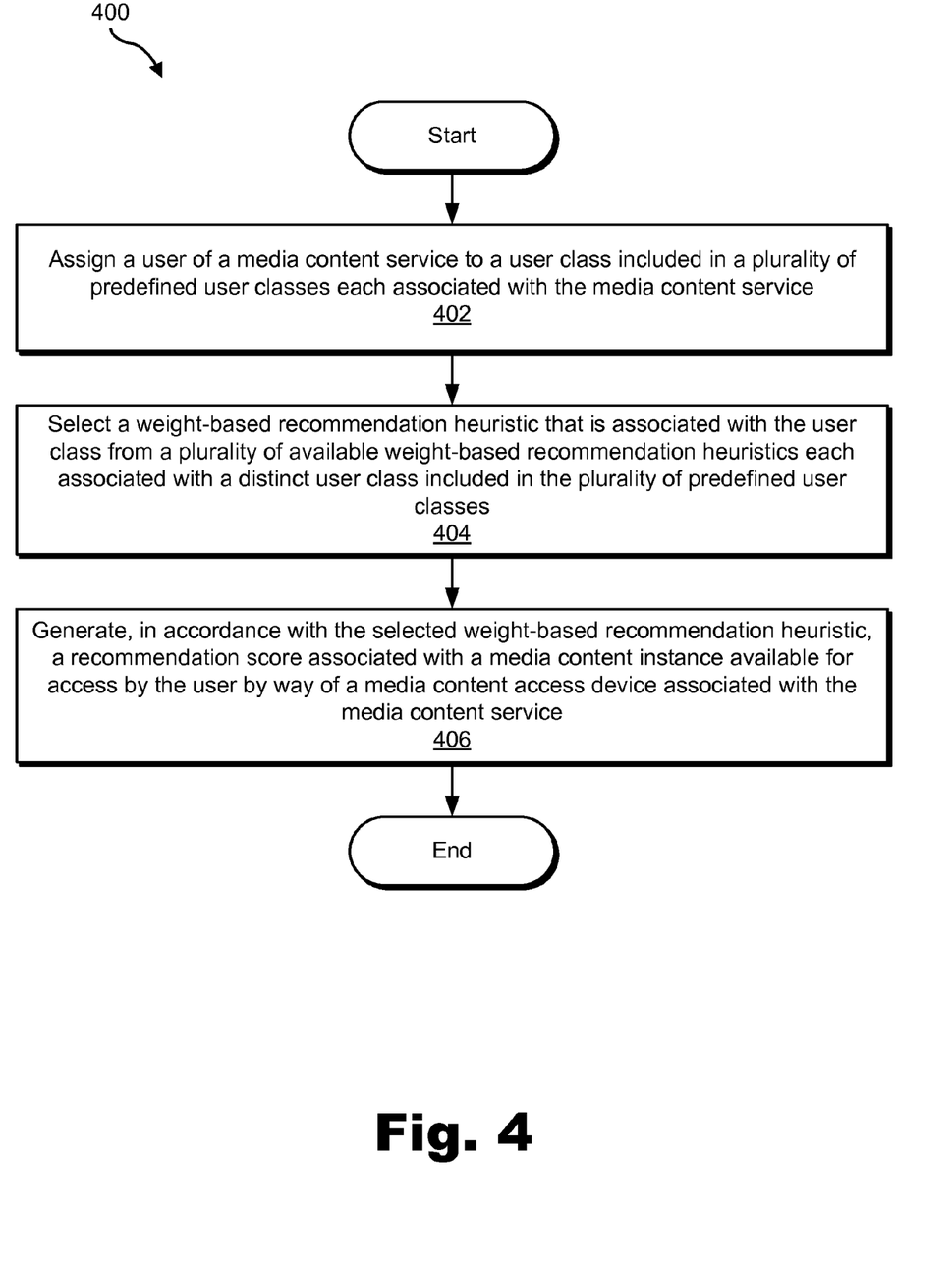
FIG. 4 illustrates an exemplary user class based media content recommendation method according to principles described herein.

FIG. 4 illustrates an exemplary user class based media content recommendation method 400. While FIG. 4 illustrates exemplary steps according to one embodiment, other embodiments may omit, add to, reorder, and/or modify any of the steps shown in FIG. 4. One or more of the steps shown in FIG. 4 may be performed by system 100 and/or any implementation thereof.

In step 402, a media content recommendation system assigns a user of a media content service to a user class included in a plurality of predefined user classes each associated with the media content service. Step 402 may be performed in any of the ways described herein.

In step 404, the media content recommendation system selects a weight-based recommendation heuristic that is associated with the user class from a plurality of available weight-based recommendation heuristics each associated with a distinct user class included in the plurality of predefined user classes. Step 404 may be performed in any of the ways described herein.

In step 406, the media content recommendation system generates, in accordance with the selected weight-based recommendation heuristic, a recommendation score associated with a media content instance available for access by the user by way of a media content access device associated with the media content service. Step 406 may be performed in any of the ways described herein.

Various implementations of system 100 and method 400 will now be described. It will be recognized that the implementations described herein are merely illustrative of the many different implementations that may be realized in connection with the methods and systems described herein.

In some examples, system 100 may generate a recommendation score associated with a media content instance in accordance with a weight-based recommendation heuristic by solving the following equation:

$$T = W_u * S_u + W_h * S_h + W_f * S_f + W_c * S_c \quad \text{(Equation 1)}.$$

In Equation 1, T is representative of the recommendation score associated with the media content instance. In the examples provided herein, the recommendation score associated with a media content instance may be limited to being in the range of zero to one hundred (i.e., $0 \leq T \leq 100$). A relatively high recommendation score within this range indicates that the media content instance is likely of interest to the user. A relatively low recommendation score within the range indicates that the media content instance is likely not of interest to the user. Hence, a first media content instance that has a recommendation score that is higher than a second media content instance is likely to be of more interest to the user than the second media content instance.

$S_u$, $S_h$, $S_f$, and $S_c$ are representative of various source values used in combination to determine the recommendation score. Each source value may also be limited to the range of zero to one hundred for purposes of the examples provided herein. A brief explanation of each of the source values $S_u$, $S_h$, $S_f$, and $S_c$ will now be provided. It will be recognized that additional or alternative source values may be used in accordance with the methods and systems described herein as may serve a particular implementation.

As used herein, $S_u$ is representative of a rating or score of the media content instance that may be automatically generated by system 100 based on one or more preferences of the user as specified within a user profile of the user. System 100 may automatically generate $S_u$ in any suitable manner.

For example, a user may be asked to rate his or her interest in a variety of different media categories and/or genres when completing a user profile associated with a media content service. To illustrate, the user may indicate, on a scale of one to ten, that his interest level in "action and adventure" movies is a nine. Based on this information and on metadata associated with a particular media content instance, system 100 may assign a rating to the media content instance. For example, an action movie entitled "Avatar" may be assigned a relatively high value for $S_u$ (e.g., 90) if the user has indicated that he or she is highly interested in action movies.

It will be recognized that additional or alternative user profile information may be used to generate $S_u$. For example, demographic information specified within a user profile of a user may additionally or alternatively be used to generate $S_u$.

As used herein, $S_h$ is representative of a rating or score of the media content instance that may be automatically generated by system 100 based on a media content access history of the user. System 100 may automatically generate $S_h$ in any suitable manner.

For example, system 100 may determine that the user has accessed (e.g., watched) a relatively high number of comedies. Based on this information and on metadata associated with a particular media content instance, system 100 may assign a relatively high rating (e.g., 95) to a media content instance designated as being a comedy.

As used herein, $S_f$ is representative of an average rating or score of the media content instance provided by one or more social media contacts of the user (e.g., social media friends, people "followed" by the user on one or more social media services, etc.). For example, one or more social media contacts of the user may have each already experienced the media content instance and given the media content instance a particular rating. System 100 may be configured to determine a value for $S_f$ by calculating an average of the individual ratings provided by the one or more social media contacts.

As used herein, $S_c$ is representative of an average rating of the media content instance provided by one or more users who are not social media contacts of the user. The one or more users who are not social media contacts of the user may include one or more users of the media content service, one or more members of an online community of which the user is a part, and/or any other user or entity not designated as being a social media contact of the user.

Referring again to Equation 1, $W_u$, $W_h$, $W_f$, and $W_c$ are weighting factors associated with each of the source values $S_u$, $S_h$, $S_f$, and $S_c$ respectively. The weighting factors may be configured to weight each of the source values in accordance with the particular weight-based recommendation heuristic employed to generate the recommendation score. In other words, the value of each weighting factor depends on the particular user class to which a user is assigned.

To illustrate, Equations 2-5 show exemplary formulas that may be used to define each of the weighting factors $W_u$, $W_h$, $W_f$, and $W_c$:

$$W_u = C_u * V_u + (C_h - W_h) \quad \text{(Equation 2)},$$

$$W_h = C_h * V_h \quad \text{(Equation 3)},$$

$$W_f = C_f * V_f \quad \text{(Equation 4), and}$$

$$W_c = C_c * V_c + (C_f - W_f) \quad \text{(Equation 5)}.$$

In the preceding equations, $C_u$ is a predetermined coefficient configured to fine tune the weighting factor $W_u$, $C_h$ is a predetermined coefficient configured to fine tune the weighting factor $W_h$, $C_f$ is a predetermined coefficient configured to fine tune the weighting factor $W_f$, and $C_c$ is a predetermined coefficient configured to fine tune the weighting factor $W_c$. In some examples, the summed value of each of the predetermined coefficients $C_u$, $C_h$, $C_f$, and $C_c$ is equal to one. As will be illustrated below, each available weight-based recommendation heuristic may be associated with a distinct combination of values for the predetermined coefficients $C_u$, $C_h$, $C_f$, and $C_c$.

The variables $V_u$, $V_h$, $V_f$, and $V_c$, as shown in the preceding equations, are configured to further fine tune the weighting factors $W_u$, $W_h$, $W_f$, and $W_c$. For example, $V_c$ may be set to be equal to either one or zero depending on whether one or more users who are not social media contacts of the user have rated the media content instance. For example, $V_c$ may be set to be equal to one if one or more users who are not social media contacts have rated the media content instance and equal to zero if the one or more users who are not social media contacts of the user have not rated the media content instance.

$V_f$ may also be set to be equal to one if a number of social media contacts of the user who have rated the media content instance is greater than or equal to a predetermined number (e.g., greater than or equal to fifty). This signifies that the average rating of the media content instance by social media contacts (i.e., $S_f$) should be given as much weight in Equation 1 as allowed by the selected weight-based recommendation heuristic. Alternatively, $V_f$ may be set to be equal to a ratio of the number of social media contacts of the user who have rated the media content instance to the predetermined number if the number of social media contacts of the user who have rated the media content instance is less than the predetermined number. For example, if the predetermined number is fifty, and twenty-five of the social media contacts have rated the media content instance, $V_f$ may be equal to 0.5.

$V_h$ may be set to be equal to a ratio of the number of media content instances that are available within a media content library associated with the media content service and that have been accessed by the user to a total number of media content instances that are available within the determined media content library. For example, if the user has accessed (e.g., watched and/or recorded) fifty out of one hundred media content instances in a media content library associated with the media content service, $V_h$ may be set to be equal to 0.5.

Finally, $V_u$ may be set to be equal to one if the user has created a user profile associated with the media content service. Conversely, $V_u$ may be set to be equal to zero if the user has not created a user profile associated with the media content service.

As mentioned, each available weight-based recommendation heuristic may be associated with a distinct combination of values for the predetermined coefficients $C_u$, $C_h$, $C_f$, and $C_c$ that are used to fine tune the weighting factors $W_u$, $W_h$, $W_f$, and $W_c$. To illustrate, Table 1 shows exemplary values of the predetermined coefficients $C_u$, $C_h$, $C_f$, and $C_c$ that may be associated with each of the weight-based recommendation heuristics that correspond to the five user classes described herein.

TABLE 1

| User Class | $C_u$ | $C_h$ | $C_f$ | $C_c$ | Total |
|---|---|---|---|---|---|
| Anonymous | 0 | 0 | 0 | 1 | 1 |
| Social Anonymous | 0 | 0 | 0.6 | 0.4 | 1 |
| New | 0.6 | 0 | 0 | 0.4 | 1 |
| Early | 0.4 | 0.2 | 0.2 | 0.2 | 1 |
| Fully Active | 0.2 | 0.4 | 0.2 | 0.2 | 1 |

The values of $C_u$, $C_h$, $C_f$, and $C_c$ shown in Table 1 are merely illustrative and may be set by system 100, by a user, and/or in any other manner. For example, each coefficient may be specified by system 100 based on a total number of media content instances included in a media content library associated with the media content service, an age of each media content instance in the media content library (i.e., how long each media content instance has been in the media content library), a size of the user's social media network, a total number of users of the media content service, and/or any other factor as may serve a particular implementation.

As shown in Table 1, a distinct set of coefficients may be associated with each user class (i.e., with each weight-based recommendation heuristic that corresponds to each user class). For example, Table 1 shows that $C_u$, $C_h$, $C_f$, and $C_c$ have values of 0.4, 0.2, 0.2, and 0.2, respectively, for the "early" user class. Hence, the user profile of the user is given relatively more weight than the other sources when determining a recommendation score for a user in the "early" user class. In contrast, Table 1 shows that $C_u$, $C_h$, $C_f$, and $C_c$ have values of 0.2, 0.4, 0.2, and 0.2, respectively for the "fully active" user class, which signifies that the media content access history of the user is given relatively more weight than the other sources when determining a recommendation score for a user in the "fully active" user class.

Using the values of $C_u$, $C_h$, $C_f$, and $C_c$ shown in Table 1, system 100 may determine the weighting factors $W_u$, $W_h$, $W_f$, and $W_c$ in accordance with the equations shown in Table 2.

TABLE 2

| User Class | $W_u$ | $W_h$ | $W_f$ | $W_c$ |
|---|---|---|---|---|
| Anonymous | 0 | 0 | 0 | $V_c$ |
| Social Anonymous | 0 | 0 | $0.6*V_f$ | $0.4*V_c + (0.6 - 0.6*V_f)$ |
| New | $0.6*V_u$ | 0 | 0 | $0.4*V_c$ |
| Early | $0.4*V_u + (0.2 - 0.2*V_h)$ | $0.2*V_h$ | $0.2*V_f$ | $0.2*V_c + (0.2 - 0.2*V_f)$ |
| Fully Active | $0.2*V_u + (0.4 - 0.4*V_h)$ | $0.4*V_h$ | $0.2*V_f$ | $0.2*V_c + (0.2 - 0.2*V_f)$ |

As illustrated in Table 2, a weight-based recommendation heuristic associated with an "anonymous" user class relies solely on the average rating of a media content instance as provided by one or more users who are not social media contacts of the user (i.e., $S_c$). On the other hand, a weight-based recommendation heuristic associated with a "fully active" user class relies on a weighted combination of each of the source values $S_u$, $S_h$, $S_f$, and $S_c$.

An example of generating a recommendation score associated with a particular media instance for a user of a media content service in accordance with the values shown in Tables 1 and 2 will now be provided. In this example, a recommendation score for a movie entitled "Avatar" is to be generated for a user assigned to the "early" user class. In this example, $V_u$ is equal to one because the user has created a user profile, $V_h$ is equal to 0.10 because the user has watched ten percent of the movies in the movie library associated with the media content service, $V_f$ is equal to one because a relatively large number of social media contacts of the user have rated the movie, and Vc is equal to one because one or more users who are not social media contacts of the user (e.g., members of an online community of which the user is a part) have rated the movie. These values are shown in the second column of Table 3 below.

TABLE 3

| Category | $V_i$ | $W_i$ | $S_i$ | Subtotal |
|---|---|---|---|---|
| User Profile | 1 | 0.58 | 90 | 52.2 |
| Access History | 0.10 | 0.02 | 75 | 1.5 |
| Friends | 1 | 0.2 | 80 | 16 |
| Community | 1 | 0.2 | 85 | 17 |
| | | | Total | 86.7 |

Based on the values of $V_u$, $V_h$, $V_f$, and $V_c$ and on the equations shown in Table 2 for the "early" user class, each weighting factor $W_u$, $W_h$, $W_f$, and $W_c$ may be calculated. The calculated values are shown in Table 3.

Exemplary values for each of the source values $S_u$, $S_h$, $S_f$, and $S_c$ are also shown in Table 3. As shown, system 100 has automatically generated a value of 90 for $S_u$ and a value of 75 for $S_h$. The values for $S_f$ and $S_c$, respectively, are shown to be 80 and 85.

With the values set as shown in Table 3, a recommendation score may be generated for the movie in accordance with Equation 1 above. As shown in Table 3, the recommendation score is 86.7 in this particular example. The relatively high value of this recommendation score indicates that the user is likely to be interested in the movie. System 100 may act on this recommendation score in any of the ways described herein.

Figure 5:
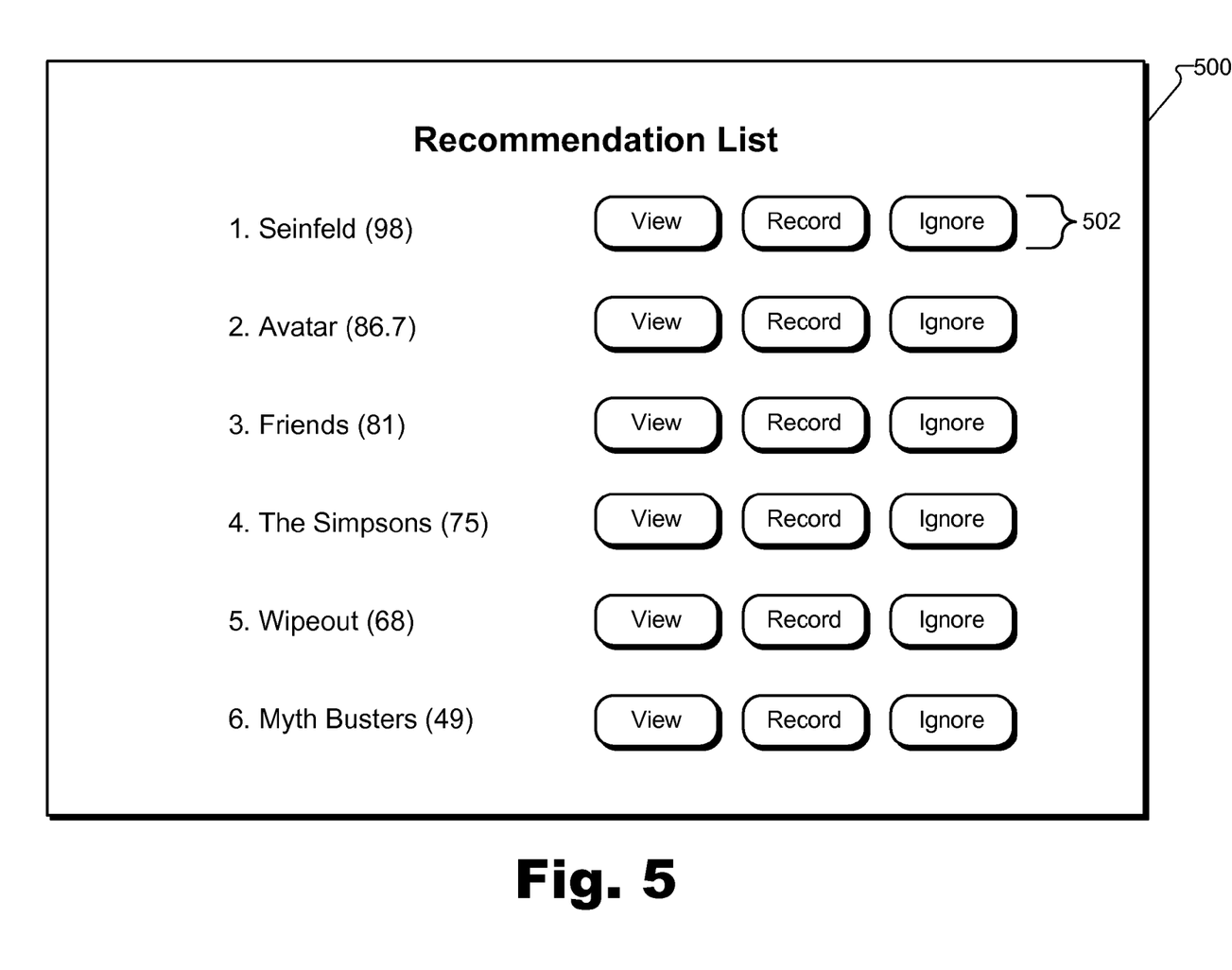
FIG. 5 shows an exemplary graphical user interface ("GUI") in which a list of recommended media content instances for a user is presented according to principles described herein.

For example, as described above, system 100 may include the movie in a list of recommended media content instances available to the user. To illustrate, FIG. 5 shows an exemplary GUI 500 in which a list of recommended media content instances for a user is presented. As shown, one or more media content processing options (e.g., options 502) may be presented within GUI 500 together with each recommended media content instance. For example, a user may select one or more of options 502 to view, record, or ignore the first listed media content instance (i.e., "Seinfeld").

In some examples, a presentation order of the list of recommended media content instances presented in GUI 500 may be based on the recommendation score of each media content instance included in the list. For example, in the particular example of FIG. 5, the media content instance named "Seinfeld" is the highest ranked media content instance and the media content instance named "Avatar" is the second-highest ranked media content instance.

In some examples, as shown in FIG. 5, the actual recommendation score associated with each media content instance included in the list of recommended media content instances may be presented within GUI 500 along with the name of each recommended media content instance. For example, FIG. 5 shows that "Seinfeld" has a recommendation score of 98 and that "Avatar" has a recommendation score of 86.7. It will be recognized that the recommendation scores may alternatively not be presented within GUI 500.

Figure 6:
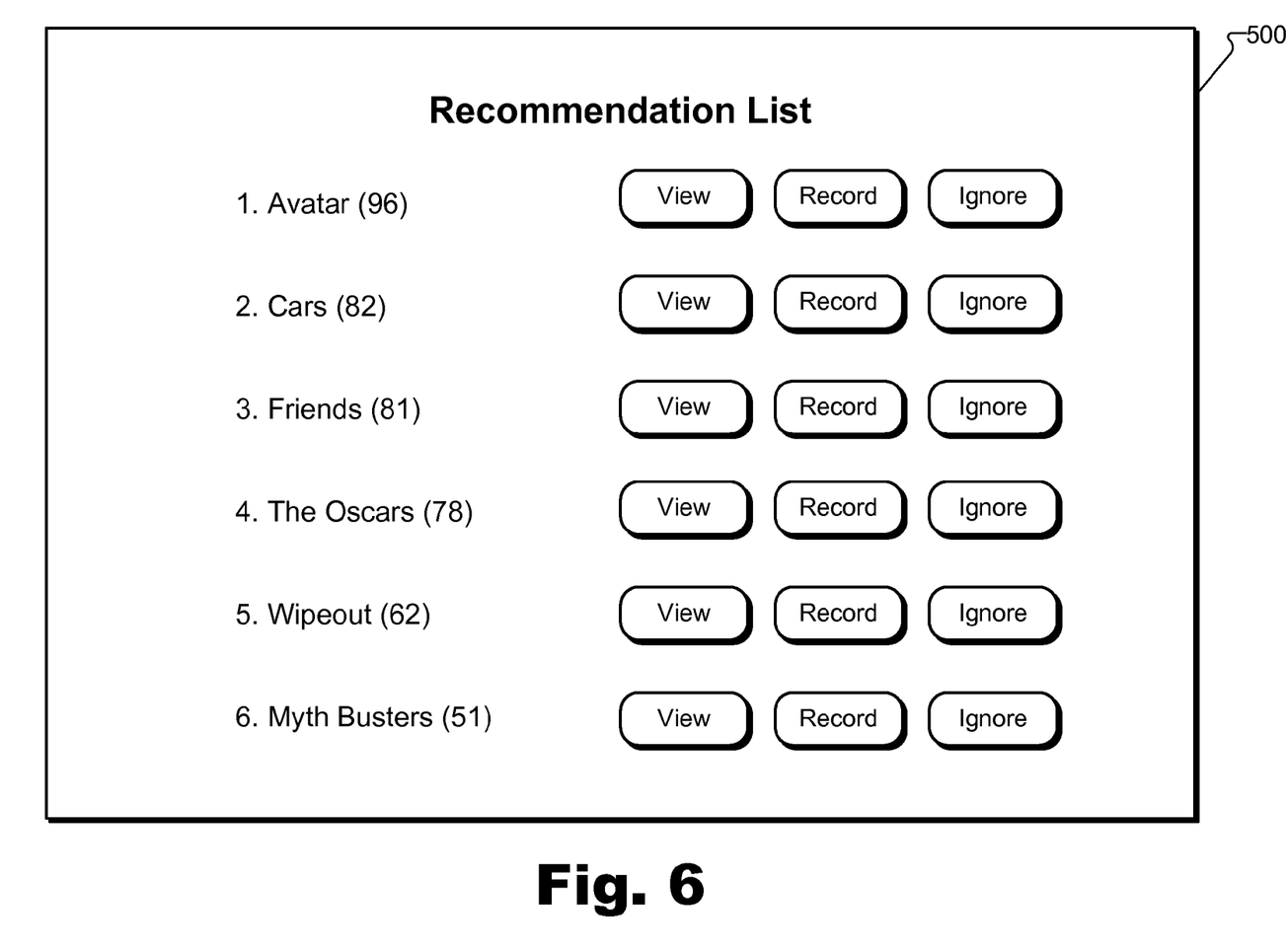
FIG. 6 shows the GUI of FIG. 5 after the list of recommended media content programs has been updated in accordance with new recommendation values.

In some examples, the list of recommended media content programs presented in GUI 500 may be dynamically updated in real-time as the contents, recommendation scores, and/or order of the list of recommended media content programs change over time. For example, a user may be reassigned to a different user class. In response, system 100 may use a different weight-based recommendation heuristic to generate recommendation scores for each of the media content instances included in the list of recommended media content instances. FIG. 6 shows GUI 500 after the list of recommended media content programs has been updated in accordance with the new recommendation scores. As shown, both the contents and order of the list of recommended media content programs have been updated.

Figure 7:
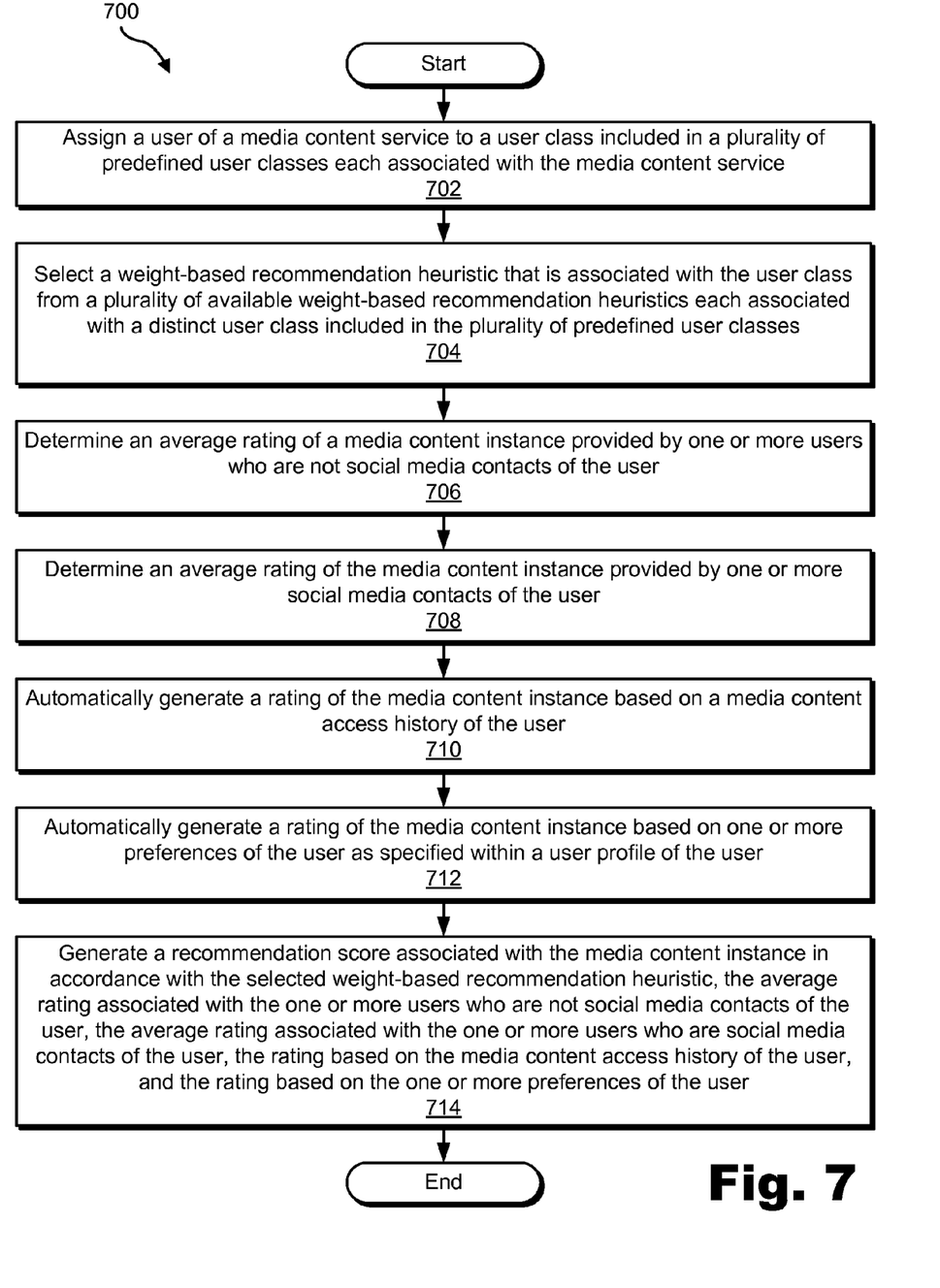
FIG. 7 illustrates another exemplary user class based media content recommendation method according to principles described herein.

FIG. 7 illustrates another exemplary user class based media content recommendation method 700. While FIG. 7 illustrates exemplary steps according to one embodiment, other embodiments may omit, add to, reorder, and/or modify any of the steps shown in FIG. 7. One or more of the steps shown in FIG. 7 may be performed by system 100 and/or any implementation thereof.

In step 702, a media content recommendation system assigns a user of a media content service to a user class included in a plurality of predefined user classes each associated with the media content service. Step 702 may be performed in any of the ways described herein.

In step 704, the media content recommendation system selects a weight-based recommendation heuristic that is associated with the user class from a plurality of available weight-based recommendation heuristics each associated with a distinct user class included in the plurality of predefined user classes. Step 704 may be performed in any of the ways described herein.

In step 706, the media content recommendation system determines an average rating of a media content instance provided by one or more users who are not social media contacts of the user. Step 706 may be performed in any of the ways described herein.

In step 708, the media content recommendation system determines an average rating of the media content instance provided by one or more social media contacts of the user. Step 708 may be performed in any of the ways described herein.

In step 710, the media content recommendation system automatically generates a rating of the media content instance based on a media content access history of the user. Step 710 may be performed in any of the ways described herein.

In step 712, the media content recommendation system automatically generates a rating of the media content instance based on one or more preferences of the user as specified within a user profile of the user. Step 712 may be performed in any of the ways described herein.

In step 714, the media content recommendation system generates a recommendation score associated with the media content instance in accordance with the selected weight-based recommendation heuristic, the average rating associated with the one or more users who are not social media contacts of the user, the average rating associated with the one or more users who are social media contacts of the user, the rating based on the media content access history of the user, and the rating based on the one or more preferences of the user. Step 714 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 8:
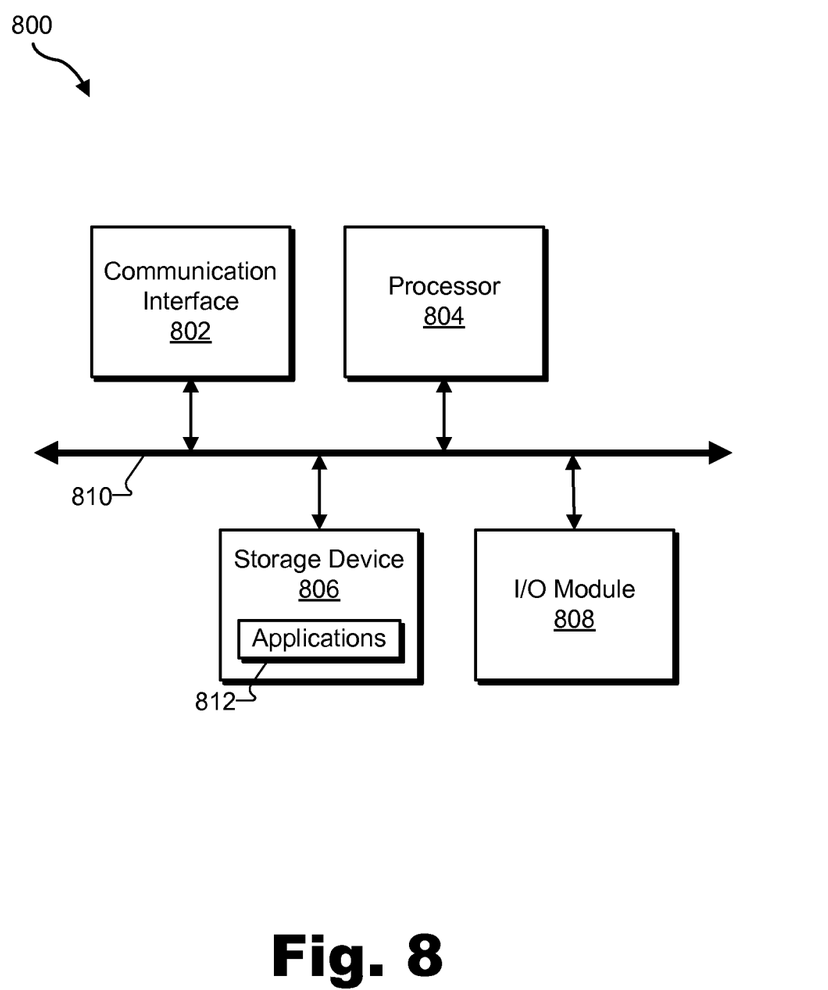
FIG. 8 illustrates an exemplary computing device according to principles described herein.

FIG. 8 illustrates an exemplary computing device 800 that may be configured to perform one or more of the processes described herein. As shown in FIG. 8, computing device 800 may include a communication interface 802, a processor 804, a storage device 806, and an input/output ("I/O") module 808 communicatively connected via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 806. For example, data representative of one or more executable applications 812 configured to direct processor 804 to perform any of the operations described herein may be stored within storage device 806. In some examples, data may be arranged in one or more databases residing within storage device 806.

I/O module 808 may be configured to receive user input and provide user output and may include any hardware, firmware, software, or combination thereof supportive of input and output capabilities. For example, I/O module 808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 808 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with user class management facility 102 and/or recommendation management facility 104. Likewise, storage facility 106 may be implemented by or within storage device 806.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   providing, by a media content recommendation system, a plurality of available weight-based recommendation heuristics each associated with a distinct user class included in a plurality of predefined user classes each associated with a media content service;
   assigning, by the media content recommendation system, a user of the media content service to a user class included in the plurality of predefined user classes;
   selecting, by the media content recommendation system based on the assigning, a weight-based recommendation heuristic that is associated with the user class from the plurality of available weight-based recommendation heuristics; and
   generating, by the media content recommendation system in accordance with the selected weight-based recommendation heuristic, a recommendation score associated with a media content instance available for access by the user by way of a media content access device associated with the media content service.

2. The method of claim 1, further comprising:
   determining, by the media content recommendation system, that the recommendation score associated with the media content instance is above a predetermined threshold; and
   presenting, by the media content recommendation system in response to the determining that the recommendation score is above the predetermined threshold, one or more access options associated with the media content instance within a graphical user interface.

3. The method of claim 2, wherein the presenting of the one or more access options associated with the media content instance within the graphical user interface comprises presenting the one or more access options within a graphical user interface displayed within a display screen of a companion device separate from the media content access device.

4. The method of claim 2, wherein the presenting of the one or more access options associated with the media content instance within the graphical user interface comprises presenting the one or more access options within a graphical user interface displayed within a display screen associated with the media content access device.

5. The method of claim 2, further comprising:
   detecting, by the media content recommendation system, a selection by the user of an access option included in the one or more access options associated with the media content instance; and
   directing, by the media content recommendation system, the media content access device to perform the selected access option.

6. The method of claim 1, further comprising generating, by the media content recommendation system in accordance with the selected weight-based recommendation heuristic, one or more additional recommendation scores associated with one or more additional media content instances available for access by the user by way of the media content access device.

7. The method of claim 6, further comprising:
   ranking, by the media content recommendation system, the media content instance and the one or more additional media content instances based on the recommendation scores associated with the media content instance and the one or more additional media content instances; and
   presenting, by the media content recommendation system within a graphical user interface, a list of recommended media content instances including the media content instance and the one or more additional media content instances in accordance with a presentation order that is based on the ranking of the media content instance and the one or more additional media content instances.

8. The method of claim 1, further comprising:
   detecting, by the media content recommendation system, one or more operations performed by the user with respect to the media content service subsequent to the generating of the recommendation score;
   reassigning, by the media content recommendation system based on the detected one or more operations, the user to a different user class included in the plurality of predefined user classes;
   selecting, by the media content recommendation system, a different weight-based recommendation heuristic that is associated with the different user class from the plurality of available weight-based recommendation heuristics; and
   generating, by the media content recommendation system in accordance with the different weight-based recommendation heuristic, a new recommendation score associated with at least one of the media content instance.

9. The method of claim 1, further comprising presenting, by the media content recommendation system, the recommendation score associated with the media content instance within a graphical user interface.

10. The method of claim 1, wherein the assigning of the user to the user class comprises:
   detecting one or more operations performed by the user with respect to the media content service; and
   assigning the user to the user class based on the one or more operations performed by the user with respect to the media content service.

11. The method of claim 10, wherein the one or more operations performed by the user with respect to the media content service comprise at least one of using the media content service, creating an account associated with the media content service, creating a user profile associated with the media content service, linking a social media network of the user with the media content service, and accessing one or more media content instances available by way of the media content service.

12. The method of claim 1, wherein the selected weight-based recommendation heuristic is based on a weighted combination of at least one of an average rating of the media content instance provided by one or more social media contacts of the user, an average rating of the media content instance provided by one or more users who are not social media contacts of the user, an automatically generated rating of the media content instance based on a media content access history of the user, and an automatically generated rating of the media content instance based on one or more preferences of the user as specified within a user profile of the user.

13. The method of claim 1, wherein the generating of the recommendation score associated with the media content instance in accordance with the selected weight-based recommendation heuristic comprises determining a value for $T = W_u * S_u + W_h * S_h + W_f * S_f + W_c * S_c$, wherein
   T is representative of the recommendation score,
   $W_f$ is a weighting factor equal to $C_f * V_f$,
   $W_c$ is a weighting factor equal to $C_c * V_c + (C_f - W_f)$,
   $W_h$ is a weighting factor equal to $C_h * V_h$,
   $W_u$ is a weighting factor equal to $C_u * V_u + (C_h - W_h)$,
   $V_c$ is equal to one if one or more users who are not social media contacts of the user have rated the media content instance and equal to zero if the one or more users who are not social media contacts of the user have not rated the media content instance,
   $V_f$ is equal to one if a number of social media contacts of the user who have rated the media content instance is greater than or equal to a predetermined number and equal to a ratio of the number of social media contacts of the user who have rated the media content instance to the predetermined number if the number of social media contacts of the user who have rated the social media content instance is less than the predetermined number,
   $V_h$ is equal to a ratio of the number of media content instances that are available within a predetermined media content library and that have been accessed by the user to a total number of media content instances that are available within the determined media content library,
   $V_u$ is equal to one if the user has created a user profile associated with the media content service and equal to zero if the user has not created a user profile associated with the media content service,
   $C_c$ is a predetermined coefficient configured to fine tune the weighting factor $W_c$,
   $C_f$ is a predetermined coefficient configured to fine tune the weighting factor $W_f$,
   $C_h$ is a predetermined coefficient configured to fine tune the weighting factor $W_h$, and
   $C_u$ is a predetermined coefficient configured to fine tune the weighting factor $W_u$,
   $S_c$ is representative of an average rating of the media content instance provided by the one or more users who are not social media contacts of the user,
   $S_f$ is representative of an average rating of the media content instance provided by the one or more social media contacts of the user,
   $S_h$ is representative of a rating of the media content instance that is automatically generated based on a media content access history of the user, and
   $S_u$ is representative of a rating of the media content instance that is automatically generated based on one or more preferences of the user as specified within a user profile of the user.

14. The method of claim 13, wherein each of the available weight-based recommendation heuristics is associated with a distinct set of values for the predetermined coefficients $C_c$, $C_f$, $C_h$, and $C_u$.

15. The method of claim 1, embodied as computer-executable instructions on at least one non-transitory computer-readable medium.

16. A method comprising:
   assigning, by a media content recommendation system, a user to a user class included in a plurality of predefined user classes;
   selecting, by the media content recommendation system, a weight-based recommendation heuristic that is associated with the user class from a plurality of available weight-based recommendation heuristics each associated with a distinct user class included in the plurality of predefined user classes; and
   determining, by the media content recommendation system, an average rating of a media content instance provided by one or more users who are not social media contacts of the user;
   determining, by the media content recommendation system, an average rating of the media content instance provided by one or more social media contacts of the user;
   automatically generating, by the media content recommendation system, a rating of the media content instance based on a media content access history of the user;
   automatically generating, by the media content recommendation system, a rating of the media content instance based on one or more preferences of the user as specified within a user profile of the user; and generating, by the media content recommendation system, a recommendation score associated with the media content instance in accordance with the selected weight-based recommendation heuristic, the average rating associated with the one or more users who are not social media contacts of the user, the average rating associated with the one or more users who are social media contacts of the user, the rating based on the media content access history of the user, and the rating based on the one or more preferences of the user.

17. The method of claim 16, further comprising:

determining, by the media content recommendation system, that the recommendation score associated with the media content instance is above a predetermined threshold; and presenting, by the media content recommendation system in response to the determining that the recommendation score is above the predetermined threshold, one or more access options associated with the media content instance within a graphical user interface.

18. The method of claim 16, embodied as computer-executable instructions on at least one non-transitory computer-readable medium.

19. A system comprising:

at least one computing device including a processor and comprising:

a user class management facility configured to direct the processor to assign a user of a media content service to a user class included in a plurality of predefined user classes each associated with the media content service; and a media content recommendation management facility communicatively coupled to the user class management facility and configured to direct the processor to provide a plurality of available weight-based recommendation heuristics each associated with a distinct user class included in the plurality of predefined user classes, select a weight-based recommendation heuristic that is associated with the user class from the plurality of available weight-based recommendation heuristics, and generate, in accordance with the selected weight-based recommendation heuristic, a recommendation score associated with a media content instance available for access by the user by way of media content access device associated with the media content service.

20. The system of claim 19, wherein the media content recommendation management facility is further configured to direct the processor to:

determine that the recommendation score associated with the media content instance is above a predetermined threshold; and present, in response to the determining that the recommendation score is above the predetermined threshold, one or more access options associated with the media content instance within a graphical user interface.

* * * * *